United States Patent [19]
Traube et al.

[11] 3,941,153
[45] Mar. 2, 1976

[54] WATER INLET DEVICE FOR CONTROLLING FLOW TO AN APPLIANCE

[75] Inventors: John Harry Traube; R. Bruce Sherer, both of St. Joseph, Mich.

[73] Assignee: Whirlpool Corporation, Benton Harbor, Mich.

[22] Filed: Aug. 30, 1973

[21] Appl. No.: 392,857

[52] U.S. Cl. .................................. 137/562; 251/30
[51] Int. Cl.² .......................................... F16K 7/17
[58] Field of Search ............. 137/562, 607; 251/30

[56] References Cited
UNITED STATES PATENTS

| | | | |
|---|---|---|---|
| 3,368,582 | 2/1968 | Kozel et al. | 251/30 X |
| 3,417,782 | 12/1968 | Mentnech | 137/607 X |
| 3,439,895 | 4/1969 | Marandi | 251/30 |
| 3,466,006 | 9/1969 | Livingston | 137/607 X |
| 3,559,681 | 2/1971 | Jarvis et al. | 137/594 |
| 3,754,709 | 8/1973 | Laatsch | 137/218 X |
| 3,788,347 | 1/1974 | Guth | 137/608 X |

*Primary Examiner*—William R. Cline
*Attorney, Agent, or Firm*—Hill, Gross, Simpson, Van Santen, Steadman, Chiara & Simpson

[57] ABSTRACT

A water inlet device for an appliance having a cabinet containing a washing chamber characterized by a connector housing having a cavity receiving a diaphragm valve coacting with a valve seat on a port to control flow through the cavity with the operation of the diaphragm valve being controlled by a pilot valve disposed in the appliance. The water inlet device is particularly adapted for portable appliances and preferably has means for forming a quick connection to a source of water. The diaphragm is provided with at least one orifice to allow the source of water to bleed into a pressure chamber to bias or urge the diaphragm valve to a closed position and the pilot valve selectively bleeds this pressure chamber to cause a pressure differential on the diaphragm to selectively open the valve to admit water to the washing chamber of the appliance.

13 Claims, 6 Drawing Figures

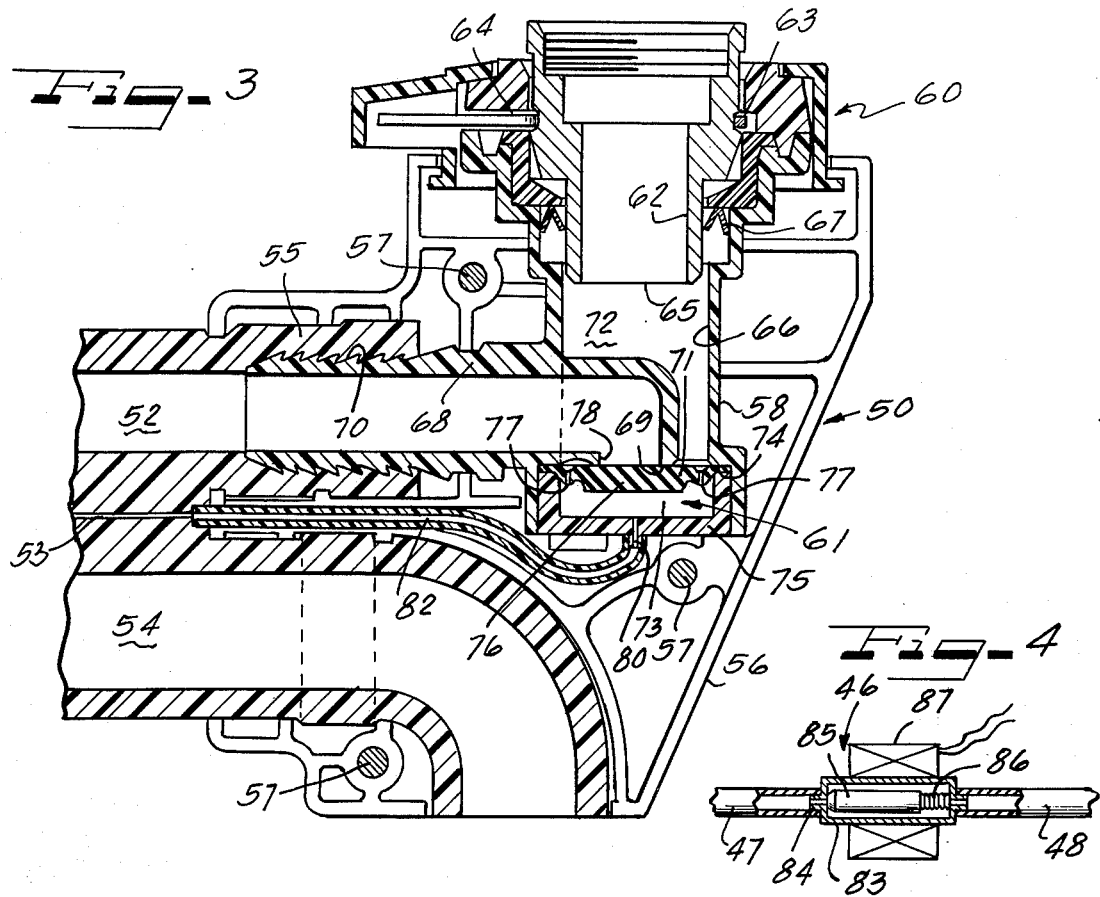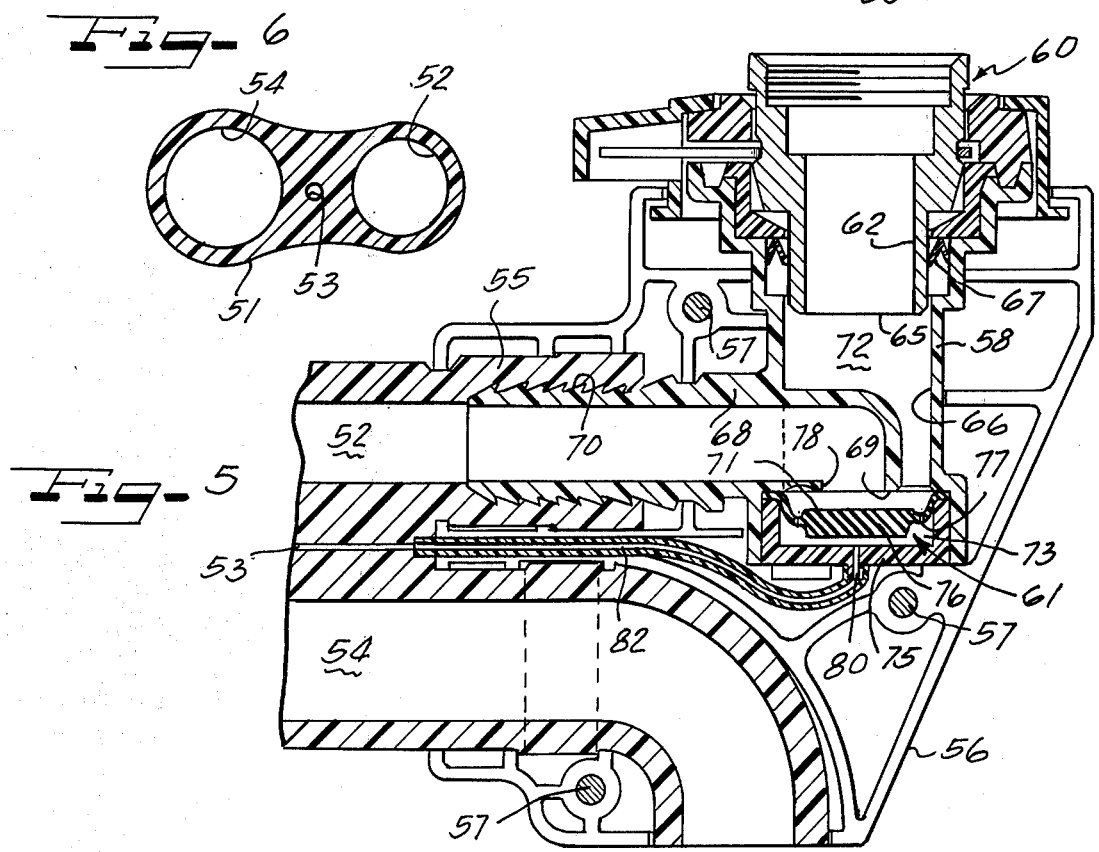

WATER INLET DEVICE FOR CONTROLLING FLOW TO AN APPLIANCE

BACKGROUND OF THE DISCLOSURE

1. Field of the Invention

The present invention is directed to a water inlet system for an appliance having a washing chamber.

2. Prior Art

In portable home appliances such as washing machines and dish washers, a washing chamber is connected to a source of water such as a faucet of a sink by a detachable coupling. An example of such a coupling is disclosed in U.S. Pat. No. 3,559,681 which issued to Robert J. Jarvis and Roland E. Nicholson on Feb. 2, 1971 and is assigned to the assignee of the present invention. As disclosed in the Jarvis et al. patent, a coupling connects a water inlet line to a faucet of a sink and also positions the outlet of a discharge line for discharging water into the sink. The coupler provides a rapid connection and disconnection to the faucet, so that when the appliance is not in use, the coupler is disconnected from the source of water to allow storage of the appliance in an area away from the source of water.

While the detachable couplers of the prior art are very useful, they do not present some problems in their manufacture and to the operators of the appliance. Since the valve for controlling the addition of the water to the washing chamber is in the cabinet of the appliance, the water inlet conduit or hose during the operation of the appliance is constantly charged with water under household water line pressure. Thus, the water inlet hose must be made of a flexible material which is also able to withstand the constant pressure of the source of water. Due to the pressure in the inlet hose, the coupler must be provided with a bleed or vent valve to reduce the pressure in the hose prior to disconnection of the coupler from the faucet to prevent spilling and splashing of water as the coupling is removed from the faucet. The requirement for the high pressure hose and the vent or bleed valve increases the cost of manufacturing the water inlet system or device.

Since it is always desirable to reduce the cost of manufacturing of home appliances, it would be desirable to remove the requirement for a high pressure hose for the inlet hose between the water source and the cabinet. For a permanently installed laundry device, it has been suggested, as shown in U.S. Pat. No. 3,446,006, to place an electrically actuated solenoid valve at the connection of the water hose to the water pipes so that during non-use of the appliance, the hoses will not be subjected to the pressure in the water lines. In such a system, the use of electrically actuated solenoid valves requires the provision of electrical lines extending up to and adjacent to the water pipes for carrying electricity to actuate the solenoid valve and this could result in a safety hazard. In a portable washing appliance, such as a dish washer or laundry device, the provision of electrically actuated solenoid valves at the coupling could increase the size of the coupling so that it would not be easy to store within the cabinet during non-use of the appliance.

SUMMARY OF THE INVENTION

The present invention is directed to a water inlet device or system which does not subject the water inlet conduit to line pressure and thus enables the reduction of manufacturing cost. The device also provides a water inlet system particularly adapted for portable appliances in which problems of water being splashed or spilled during disconnection of the system from a source of water are minimized. The present invention accomplishes these features by utilizing a coupler containing a diaphragm valve means for controlling fluid flow therethrough with the diaphragm valve means being responsive to control means located in the cabinet of the appliance. Preferably the coupling has a cavity with a diaphragm disposed thereacross to form two chambers with the first chamber having an inlet and outlet port and the second chamber being connected to the source of water by a bleed means to bias the diaphragm against a valve seat which is provided at one of the ports. To actuate the diaphragm valve, a bleed conduit selectively bleeds pressure from the second chamber in response to the control means, such as a pilot valve, disposed in the cabinet. Preferably, the water inlet system or device is for portable appliances and includes means to enable a rapid disconnection of the coupler from the source of water.

BRIEF DESCRIPTION OF THE DRAWINGS

FIG. 3 is a cross-sectional view with portions in elevation of the coupler of the water inlet device or system of the present invention;

FIG. 4 is a fragmentary schematic illustration of the control means of the water inlet system or device of the present invention with portions broken away to illustrate details;

FIG. 5 is a cross-sectional view similar to FIG. 3 illustrating the valve means in an open position; and FIG. 6 is a cross section of an integral hose utilized with the water inlet system or device of the present invention.

DESCRIPTION OF THE PREFERRED EMBODIMENTS

Figures 1, 2:
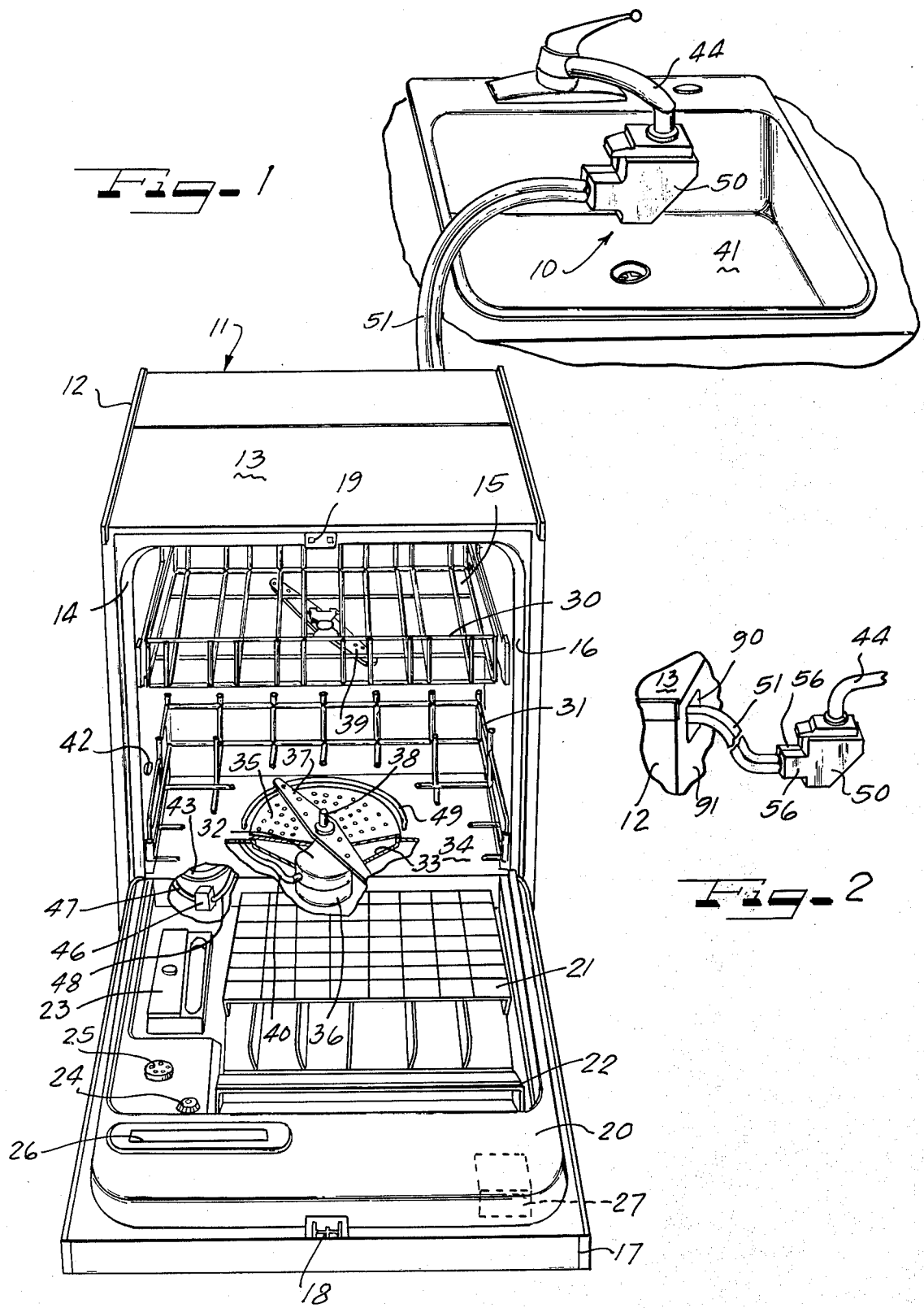
FIG. 1 illustrates a front loading dishwasher with portions broken away for illustration which dishwasher is an example of an appliance for which the water inlet system or device of the present invention is particularly adapted for connecting the appliance to a source of water.
FIG. 2 is a partial view of the water inlet system or device of the present invention illustrating the hose passage through the rear of the cabinet of the appliance.

The principles of the present invention are particularly useful for providing a water inlet system or device 10 for an appliance having a washing chamber. While the water inlet system or device of the present invention may be used on various appliances having a washing chamber, it is particularly useful in a portable dishwater, such as a front-loading dishwasher generally indicated at 11 in FIG. 1.

The front-loading dishwasher 11 has a cabinet 12 with a top 13. The cabinet 12 is provided with an opening 14 on one side which allows entry into the washing chamber or enclosure 15. To close the opening 14, a closure, such as the hollow door 17, is pivotally connected to one side of the opening and is movable from the position illustrated in FIG. 1 to a position closing the opening 14. The opening 14 is provided with a seal or gasket 16, which extends completely around the periphery of the opening. The door 17 is provided with a latching mechanism 18, which coacts with a strike 19 disposed at an edge of the opening 14 for latching the door in the closed position during which an inner panel 20 of the door 17 tightly engages the gasket 16 to provide a sealing position to prevent leakage of water from the chamber 15.

As illustrated, the inner panel 20 of the door 17 has mounted thereon silverware baskets 21 and 22, a detergent dispenser 23, a rinse additive dispenser which has a filling cap 24 and a discharge opening 25, and a vent opening 26 which allows hot humid air to escape from the chamber 15 during a drying cycle. Mounted in the hollow door 17 beneath the panel 20 is a timer 27, which is utilized to control various cycles of washing, draining or rinsing and drying along with dispensing of the detergent and dispensing of the rinse additive.

Within the washing chamber 15 are movable dish racks 30 and 31. To provide a spray of washing liquid and rinsing liquid to the dishes in the racks 30 and 31, a pump 32 is disposed in a recess or depressed sump area 33 in a bottom wall 34 of the chamber 15. To remove food particles from the liquid prior to being circulated by the pump, the sump 33 is provided with a filter screen 35. The pump 32, which is driven by a motor 36, has two pump chambers, not shown, one of which provides washing liquid under pressure to a lower spray arm 37 and through an outlet 38 to an upper spray arm 39 which is attached beneath the upper dish rack 30 by a mount which enables the arm to be free to rotate. The other pump chamber of pump 32, pumps the washing liquid during a draining or pump-out portion of the cycle through a discharge conduit 40 which is connected to a discharge conduit of a device 10 for discharge into a sink 41. Washing liquid enters the washing chamber 15 through an inlet opening 42 which is connected by a hose or conduit 43 to the inlet water system of device 10 which system delivers water under pressure from a source of water under pressure such as a faucet 44 of the sink 41. A control means or valve 46 disposed in a fluid line formed by a pair of conduits 48 and 47 (FIGS. 1 and 4), controls the discharge of fluid into the chamber 15 as will appear. Conduit 47 is connected to the inlet opening 42. A heating element 49, of the sheathed resistance type, is provided in the chamber 15 to heat the washing liquid during the washing cycle and to heat the air during a drying cycle.

The water inlet system or device 10 includes a coupler 50 which is connected by a hose or conduit 51 to the cabinet 12 through opening 90 in rear wall 91 of cabinet 12. The conduit 51 preferably has three passageways 52, 53 and 54 (see FIG. 6) with the passageway 52 forming an inlet conduit fluidly connecting the coupler 50 to the conduit 43 in the cabinet of the dishwasher. The passageway 53 forms a control conduit or bleed tube of a bleed tube circuit which is in fluid communication with the conduit 48 and the passageway 54 forms a discharge conduit in communication with the conduit 40. While the three passageways forming the three separate conduits are preferably provided in a single hose or conduit which may advantageously be an extruded vinyl hose, the three passageways may be provided by using more than one hose.

As best illustrated in FIGS. 3 and 5, the coupler 50 has an outer housing formed by a pair of molded shell pieces 56 which are held together by fastening means such as bolts 57. The outer housing receives an inner housing 58 which includes means 60 for sealingly connecting the coupler to a source of water such as the faucet 44 and has a diaphragm valve means 61 for controlling the flow of water into the inlet conduit formed by the passageway 52.

The connecting means 60 includes a fitting 62 which is provided with threads for attachment to the faucet 44 and has an annular groove 63 for receiving a latching device 64 of the means 60 which device 64 is mounted on one end of the housing 58. The latching device 64 engages the fitting 62 to attach the coupler 50 on the fitting 62 with the fitting extending into an inlet port 65 of a cavity 66 of the inner housing 58 of the coupler 50. The means 60 is described in greater detail in the above-mentioned U.S. Pat. No. 3,559,681, which description is incorporated herewithin by reference.

As illustrated, the cavity 66 of the inner housing 58 has an inlet port 65 which receives the fitting 62 and which port is provided with seal means such as member 67 for forming a water tight seal therewith. A tubular member 68 extends through a wall of the inner housing 58 into the cavity 66 and terminates in the cavity with a valve seat 69 which defines an outlet port 78 for the cavity. The member 68 is provided with external serrations on an end 70, which is opposite to the seat 69, and which end 70 is inserted in a conduit such as the inlet conduit 55 formed by the passageway 52. The member 68 adjacent the seat 69 is provided with a right angle bend so that the seat 69 faces away from the fitting 62. Preferably, the member 68 is an integral part of the molded housing 58 which may be molded of plastic.

The diaphragm valve means 61 is disposed in the cavity 66 and coacts with the valve seat 69 to control flow from the cavity 66 through the outlet port 78. The valve means 61 includes a diaphragm 71 which extends across the cavity 66 to form a first chamber 72 and a second chamber 73. To position the diaphragm 71 in the cavity 66, the cavity has an internal shoulder 74, which coacts with a cup-like closure member 75 to grip the peripheral edge of the diaphragm and position it in the cavity 66 adjacent to the valve seat 69 with the inlet and outlet ports being in the first chamber 72. The diaphragm 71 is preferably a molded member having a thick center portion 76 for engaging the valve seat 69 and a thinner peripheral edge which is provided with bleed orifices 77 to form means for bleeding water from the inlet port 65 of the first chamber 72 into the second chamber 73.

Operation of the diaphragm valve means 61 is controlled by control means 46 which controls the pressure in the second chamber 73. The cup-like member 75 is provided with an orifice 80 which is in communication with a small tube or conduit 82. The small tube or conduit 82 is in fluid communication with passageway 53 of the conduit or hose 51 which in turn is in fluid communication with the conduit 48 which is in the cabinet of the dishwasher 11. As best illustrated in FIG. 4, the control means 46, comprises a housing 83 containing a valve seat 84 which coacts with a valve member either integrally formed on an armature 85 or attached thereto. Biasing means such as a spring 86 biases the armature and valve member into sealing engagement with the valve seat 84. A coil 87 which is connected to an electrical source and controlled by the control mechanism or timer 27 is arranged to surround the housing 83. The coil 87 and the armature 85 form a pilot valve which controls flow from the chamber 73 through the fluid line formed by the conduits 48 and 47 for discharge through the inlet opening 42 into the washing chamber 15. The diaphragm valve means 61 is responsive to a control signal from the control means 46 to allow a flow of water from the cavity 66 through the inlet conduit formed by the passageway 52.

With the coil 87 de-energized, the armature closes the pilot valve of the control means 47 to prevent bleeding of pressure from the chamber 73. Due to the bleed means such as the orifices 77, pressure in the chambers 72 and 73 are equal and the thick portion of the diaphragm 71 engages the seat 69 to close the outlet port and prevent fluid flow into the inlet conduit formed by the passageway 52. With the diaphragm seated on the valve seat 69, the area acted on by the pressure in the second chamber 73 is greater than the pressure in the chamber 72 and firmly seats the thick portion 76 of the diaphragm valve means 61 on the seat 69 to close the outlet port.

When the timer 27 energizes the coil 87 of the control means 46, the fluid pressure in the second chamber 73 bleeds through the bleed tube circuit and is substantially reduced so that the pressure in the first chamber 72 creates a pressure differential to deflect or bend the diaphragm 71 away from the seat 69 (FIG. 5) to allow fluid flow through the outlet port 78 into the passageway 52 for subsequent introduction into the washing chamber 15. When the coil 87 is de-energized, the control means closes the bleed circuit and the pressure in the second chamber 73 increases and becomes equal to the pressure in the first chamber 72. Because the area exposed to the pressure is greater on the diaphragm side facing chamber 73, the forces acting on the diaphragm are greater on that side and the diaphragm will return to a position seated on the valve seat 69 (FIG. 3) to prevent further flow through the outlet port 78. As menioned above, the diaphragm when deflected to the open position (FIG. 5) is elastically deformed and has an internal resilience which aids in returning the diaphragm to the closed position such as illustrated in FIG. 3.

As mentioned above, the coupler 50 has a pair of outer shell pieces 56 which are held together by bolts 57. Each of the pieces are provided with internal ribs of a configuration to properly locate the inner housing 58 and grip the ends of the hoses forming the discharge conduit, the control conduit and the inlet conduit as the bolts 57 clamp the pieces 56 together.

In the water inlet system 10, the water pressure of the faucet 44 is contained in the cavity 66 and small tube 82 by the diaphragm valve means 61. Thus, water under pressure is limited to the cavity 66 and the device or system 10 does not require the vent valves of the prior art nor does it require an inlet hose capable of withstanding water line pressure. Since the control means or pilot valve 46 is disposed within the cabinet 12, the coupler 50 can be provided with a size and shape which enables it to be easily stored in an appropriate opening or recess 90 in a back wall 91 (FIG. 2) of the cabinet 12.

Althrough various minor modifications might be suggested by those versed in the art, it should be understood that we wish to include within the scope of the patent granted hereon all such modifications as reasonably and properly come within the scope of our contribution to the art.

The embodiments of the invention in which an exclusive property or privilege is claimed are defined as follows:

1. An appliance having a cabinet containing a washing chamber, and a water inlet system for connecting the washing chamber to a source of water which is located outside of the cabinet, the water inlet system comprising:
 a coupler having seal means for sealingly connecting the coupler to the source of water;
 an inlet conduit fluidly connecting the coupler to said washing chamber;
 a diaphragm valve means within the coupler for controlling the flow of water from said source through the inlet conduit;
 a bleed tube line forming a separate passageway fluidly connecting the diaphragm valve means to the washing chamber; and
 a control means in said bleed tube line, said control means being housed within the cabinet and selectively operable to control flow in the bleed tube line to control operation of said diaphragm valve means.

2. An appliance according to claim 1, wherein said diaphragm valve means includes a cavity having a diaphragm disposed thereacross to form a first chamber and a second chamber, said first chamber having an inlet port in communication with the source of water and an outlet port in communication with the inlet conduit, said outlet port being formed by a valve seat and coacting with said diaphragm for controlling fluid flow therethrough, and means for bleeding water from the source of water into the second chamber to urge the diaphragm onto said valve seat, and wherein said bleed tube line is connected to said second chamber for selectively bleeding said second chamber in response to actuation of the control means in said line.

3. An appliance according to claim 2, wherein the means for bleeding water to the second chamber comprises an orifice in the diaphragm.

4. An appliance according to claim 2, wherein the means for sealingly connecting the coupler to the source of water comprises a fitting attached to the source of water and means for selectively gripping the fitting so that the coupler can be quickly disconnected from the source as desired.

5. An appliance according to claim 4, which further includes a discharge conduit from the appliance, and wherein the coupler includes means for gripping an end of the discharge conduit.

6. An appliance according to claim 2, wherein the control means comprises a valve member attached to an armature, means biasing the valve member against another valve seat, and a coil being energizable to move the armature and valve member against the biasing means to open the valve seat.

7. A water inlet device for an appliance having a cabinet containing a washing chamber, said inlet device comprising:
 an outer housing having a cavity with an inlet port and an outlet port;
 means disposed in said housing for sealingly connecting the inlet port to a source of water under pressure which source is located outside of the cabinet;
 an inlet conduit fluidly connecting the outlet port of the cavity to the washing chamber;
 diaphragm valve means disposed in said cavity for controlling the flow of water through said outlet port;
 a control conduit forming a separate passageway fluidly connected to the diaphragm valve means and extending to the washing chamber in the cabinet of the appliance; and control means disposed in the cabinet and connected to said control conduit for selectively controlling fluid flow therein to control the operation of the diaphragm valve means so that the diaphragm valve means selectively opens and closes the outlet port in response to a control signal transmitted by the fluid flow in the control conduit.

8. A water inlet device according to claim 7, wherein the diaphragm valve means comprises a valve seat formed on said outlet port, a diaphragm disposed across said cavity to form a first and second chamber with said inlet and outlet ports being disposed in said first chamber, and means for bleeding water under pressure from said inlet port to the second chamber; wherein said control conduit is connected to said second chamber for bleeding water therefrom; and wherein said control means comprises a pilot valve for selectively venting the control conduit to the washing chamber to selectively bleed water from the second chamber.

9. A water inlet device according to claim 8, wherein the means for bleeding water under pressure comprises an orifice in the diaphragm so that when the pilot valve bleeds the control conduit to the washing chamber, the pressure in the first and second chambers creates a pressure differential on the diaphragm to unseat the diaphragm from the valve seat to allow water to flow around the valve seat and through the outlet port into the washing chamber.

10. A water inlet device according to claim 9, wherein the pilot valve comprises a valve member attached to an armature disposed in a coil, means biasing the armature against a valve seat to prevent flow through the control conduit so that when the coil is energized, the armature moves against the biasing means to unseat the valve member to allow the pressure acting in the second chamber to bleed through the control conduit to enable water to flow through the outlet port into the inlet conduit.

11. A water inlet device according to claim 8, wherein the said housing includes means forming a discharge port and said device includes a discharge conduit extending from the appliance to the means forming the discharge port.

12. A water inlet device according to claim 11, wherein the means for sealingly connecting the inlet port to a source of water comprises a fitting attached to the source of water under pressure and means for sealingly connecting the housing to said fitting so that the housing may be selectively connected and disconnected to the source of water.

13. A water inlet device according to claim 11, wherein the discharge conduit, control conduit, and inlet conduit are formed as an integral tubing having three separate passageways extending therealong.

* * * * *